United States Patent [19]
Moore

[11] 3,977,788
[45] Aug. 31, 1976

[54] INTERFEROMETER STABILIZER

[75] Inventor: Wayne E. Moore, College Park, Md.

[73] Assignee: The United States of America as represented by the Secretary of the Navy, Washington, D.C.

[22] Filed: Sept. 4, 1975

[21] Appl. No.: 610,215

[52] U.S. Cl. ............................ 356/106 S; 356/112; 331/94.5 C
[51] Int. Cl.² ........................................... G01B 9/02
[58] Field of Search ............ 356/106 S, 106 R, 112; 331/94.5 C, 94.5 S

[56] References Cited
UNITED STATES PATENTS

| | | | |
|---|---|---|---|
| 3,567,325 | 3/1971 | Tibbals, Jr. | 356/112 |
| 3,729,261 | 4/1973 | Sandercock | 356/112 |

OTHER PUBLICATIONS
Hernandez, G., et al., "Feedback Stabilized Fabry-Perot Interferometer", *Applied Optics* vol. 12, No. 1 pp. 126–130.

*Primary Examiner*—John K. Corbin
*Assistant Examiner*—Conrad Clark
*Attorney, Agent, or Firm*—R. S. Sciascia; Philip Schneider; George Montanye

[57] ABSTRACT

An improved system and technique for detecting and stabilizing long term thermal and mechanical drifts in a swept Fabry-Perot interferometer. Under the control of a timing circuit the distance between two interferometer optical surfaces is changed by periodically sweeping a first surface while the second surface is rocked in a positive and negative direction about two orthogonal axes. The light transmitted by the inerferometer is detected to provide a train of uniform pulses of random spacing having a maximum count when the surfaces are substantially parallel. A counter circuit senses the number of pulses during rocking in both the positive and negative direction about each axis and provides each count to a summing circuit for providing a difference output. The difference output for each axis is applied to individual long time constant integrating circuits to provide correction volages for repositioning the second surface about both orthogonal axes so that both surfaces remain substantially parallel in spite of thermal and mechanical deviations over long time periods.

12 Claims, 7 Drawing Figures

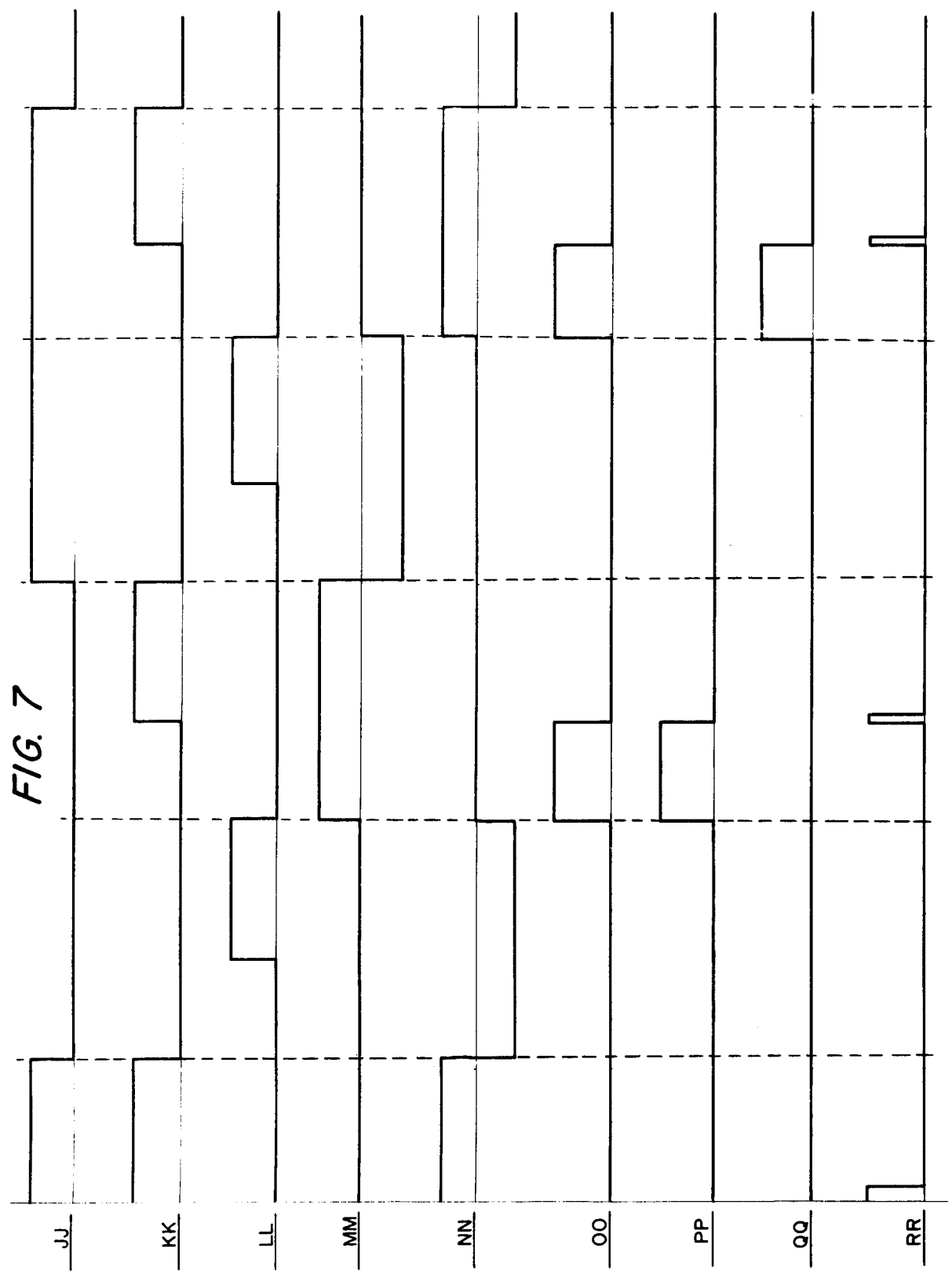

INTERFEROMETER STABILIZER

BACKGROUND OF THE INVENTION

The present invention relates to improvements in interferometer stabilizing circuits and more particularly to a new system and technique for maintaining the parallelism of optical surfaces in a swept interferometer.

Generally, swept interferometers include two optical surfaces spaced from one another along a collinear axis and positioned such that the surfaces are substantially parallel. Light from the interferometer varies in intensity as the distance between the optical surfaces is changed by sweeping one of the surfaces relative to the other along the collinear axis. The surfaces are generally controlled by the application of control voltages to piezoelectric mounting structures supporting the optical surfaces with optimal performance being obtained when the surfaces are substantially parallel. Over a period of time, from a few minutes to a few hours, the surfaces will become non-parallel due to temperature drifts, mechanical features of the piezoelectric mountings, fluctuations in positioning control voltages, and non-linear properties, such as hysteresis in the piezoelectric elements. Even if temperature can be carefully controlled, which is not an inexpensive or simple matter, the other instabilities still degrade the performance of the interferometer.

Various techniques have been utilized to prevent the surfaces from becoming non-parallel but each has met with problems limiting extensive application of such devices to interferometer systems. In one such system a photomultiplier tube detects light from an interferometer and delivers a voltage to storage capacitors. Gating signals, synchronized with the sweeping voltage of the interferometer, then control application of the voltage to piezoelectric transducers to correct for non-parallel surfaces. While this technique has been successful in compensating for temperature variations, electrical adjustments during operation are required in order to insure accurate operation over long periods of time.

In still another technique, plural light beams are used to develop control signals which indicate parallelism of the surfaces by modulation of an electrical signal from the changes in intensity of the light beams. This particular technique requires a complex arrangement of prisms and phase detectors in order to control the surface parallelism and therefore introduces still other parameters that may require substantial adjustments during operation.

While the above techniques have suggested methods for improving performance of interferometers in limited applications, there is still a continuing need for control devices that will provide accurate compensation for mechanical and temperature changes in interferometer systems. Accordingly, the present invention has been developed to overcome the specific shortcomings of the above known and similar techniques and to provide a more reliable and versatile system for maintaining the parallelism of optical surfaces.

SUMMARY OF THE INVENTION

It is therefore an object of the invention to provide an interferometer stabilization technique that can be implemented with conventional integrated circuit technology.

Another object of the invention is to provide a system for eliminating complex mechanical and temperature control in interferometer apparatus.

A still further object of the invention is to provide a technique for stabilizing interferometers over long periods of time without the need for monitoring.

Still another object of the invention is to provide a digital stabilization system which controls surface parallelism with increased accuracy and high reliability.

Yet another object of the invention is to provide improved timing and control of interferometer elements for aligning optical surfaces for optimal performance.

In order to accomplish these and other objects the invention provides improved timing and control circuitry and digital counting circuitry for increasing the accuracy of alignment of the optical surfaces of an interferometer. Light transmitted by an interferometer is detected to provide a train of pulses of random spacing having a maximum count when the optical surfaces are parallel. The surfaces are mounted on piezoelectric control elements which can rotate the surfaces in positive and negative directions about two orthogonal axes in response to error signals from digital counting circuitry. The digital counting circuitry senses a difference in count of the pulse train during rocking of the control elements about each of the axes and produces a highly accurate error signal indicating any misalignment. Under the control of novel timing circuits the rocking of the surfaces and counting of the pulse train is synchronized to produce a signal which compensates for any deviation of the optical surfaces from a parallel position. As temperature and mechanical parameters change, the system automatically responds to reestablish parallelism and optimize performance over long periods of time. Since the circuits use conventional elements and are connected in a unique manner to provide precision control, the system can be readily constructed with highly reliable integrated circuitry to provide a versatile control system for interferometers.

Other objects, advantages, and novel features of the invention will become apparent from the following detailed description of the invention when considered with the accompanying drawings wherein:

BRIEF DESCRIPTION OF THE DRAWINGS

FIGS. 6 and 7 are diagrams of the timing and control waveforms that appear at different points in the circuitry of FIGS. 1 and 2.

DETAILED DESCRIPTION OF A PREFERRED EMBODIMENT

Figure 1:
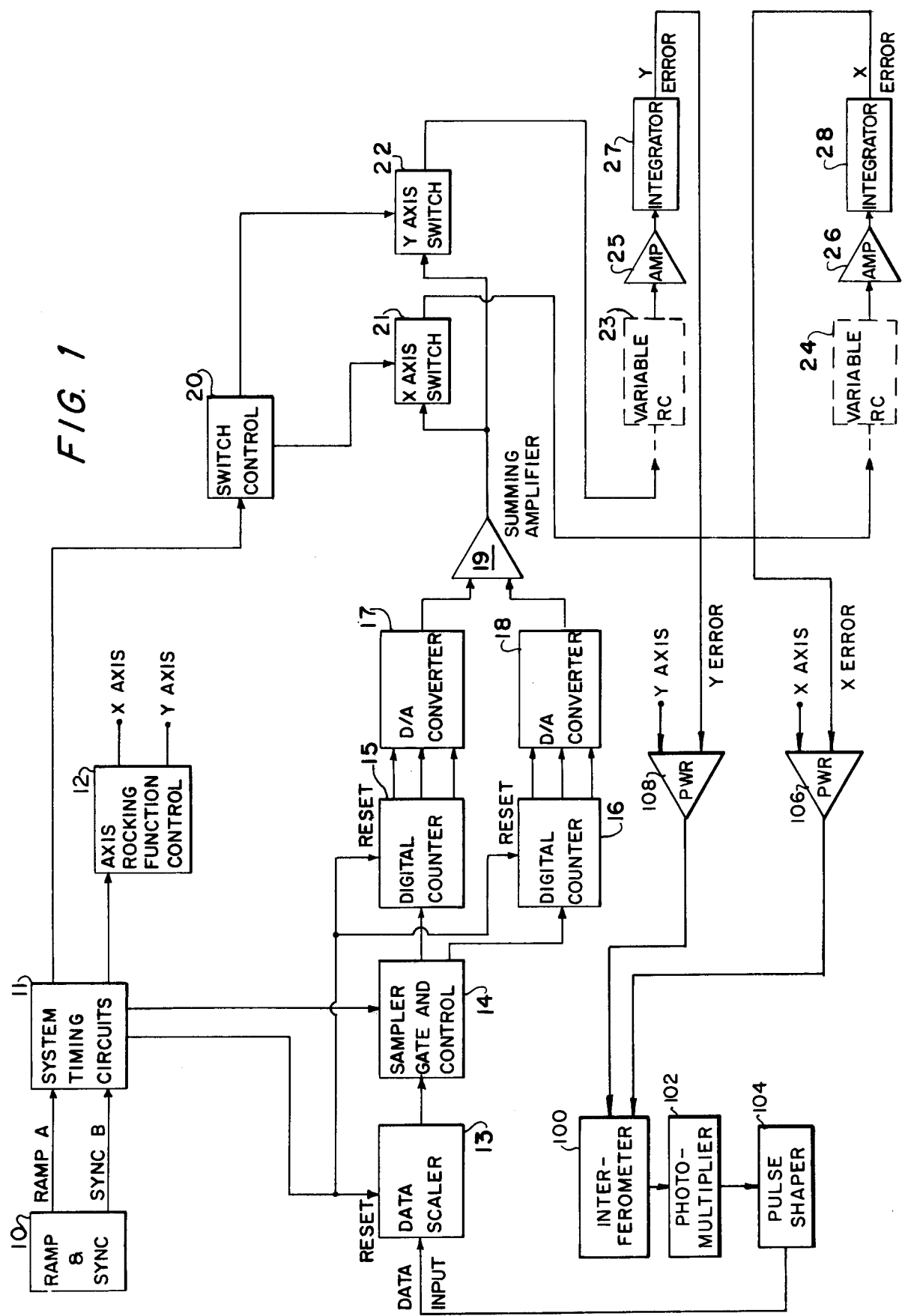
FIG. 1 is a schematic block diagram of the control system according to the present invention.

Referring now to FIG. 1, a block diagram of the present invention shows the basic arrangement of the circuits forming the improved interferometer stabilizing system. Circuit initiation and control is provided by a ramp and synchronization circuit 10 which generates a ramp waveform and sync pulse (at a predetermined time during the ramp) and delivers both waveforms to the timing circuits 11. Timing circuits 11 control and synchronize the remaining circuit elements by delivering appropriate timing signals in response to system initiation and succeeding signals from circuit 10. Axis rocking function control 12 receives timing signals from 11 and is coupled to provide positive and negative rotation of an optical surface about both X and Y axes in response thereto. Data input is received at the data scaler 13 in the form of a pulse train of random frequency representing the intensity of the light received from an interferometer 100. The pulse train is provided as output from a photomultiplier tube 102 having a pulse shaping circuit 104 connected thereto to provide a pulse train of uniform amplitude and width pulses. The pulse train is received by a data scaler 13 in response to signals from 11, which scaler acts to pass a proportional number of pulses relative to the number received. The scaler 13 passes the pulses to sampler gate and control 14 which acts in response to circuit 11 to pass pulses, from the positive or negative direction of rotation about a selected axis, to the appropriate digital counters 15 and 16, respectively, to provide a pulse count for each direction. The digital number representing the pulse count is converted to a D.C. voltage in 17 and 18 and then summed in amplifier 19 to provide a difference output. The difference signal is supplied to switches 21 and 22 and delivered to the appropriate amplifier and integrators 25, 27 or 26, 28 as determined by the switch control 20. Switch control 20 operates in response to timing signals from circuit 11 to pass the appropriate error signal through 21 or 22 to piezoelectric mounting elements in order to allow repositioning of the optical surfaces about the X and Y axis to maintain parallelism.

The interferometer 100 may, e.g., be the Fabry-Perot type, Model RC 40, made by Burleigh Instruments Inc., P.O. Box 388, East Rochester, New York. Altho this unit has three axes; only two, the X and the Y, are used herein.

Turning to FIGS. 2-5, the individual circuits forming a preferred embodiment are shown in more specific form. Initially a ramp and sync generator 10 generates a ramp or sawtooth waveform such as shown in FIG. 6AA with a sync pulse produced at the beginning of each ramp sweep as shown by FIG. 6CC. While the specific circuitry has not been shown, circuit 10 can be any well known sawtooth generator which generates a sync pulse simultaneous with the start of each ramp cycle. Timing circuits 11 (generally shown by FIG. 2) receive the sync pulse, as for example, a positive or negative 5 volt pulse of 1 μ sec or greater duration, and convert the sync pulse to a pulse waveform compatible with the logic circuitry through switch S2. For a positive sync pulse, the transistors T1 and T2 (both 2N3904's) provide level conversion to form the waveform of FIG. 6CC, while for negative sync pulses, the RC circuit at the negative input provides level conversion to produce the same waveform. The ramp input from 10 is applied at point A through C1 and R1 to the input of comparator 30 (μA710) to provide a sharp positive pulse when the ramp level crosses a level selected by the potentiometer R2. In the present example, the circuit including capacitor C1, resistor R1, and comparator 30 is designed to accept ramps up to 300 volts with a D.C. offset of 300 volts. The output of C1 is coupled to R1 which forms a divider limiting the maximum ramp amplitude to + 4 volts. The trigger level producing the pulse from comparator 30 is then selected by potentiometer R2 which level is variable between −1 and + 4 volts with the present configuration. It should be noted that if no D.C. offset voltage is used, the ramp may be coupled directly to R1 without the need of capacitor C1. The pulse output of 30 is standardized by feeding the output of 30 to the input of a one shot multivibrator 31 (74121) to produce a 2 μsec positive TTL compatible pulse shown in FIG. 6DD. The output pin 6 of 31 forms an internal trigger pulse which is coupled as input to flip-flops 32 and 33, both 7476's. As shown by FIG. 6EE, the trailing edge of the internal trigger pulse causes the output 15 of flip-flop 33 to go high to form a blanking pulse until 33 is reset at c by the converted sync pulse coupled from the switch S2. The converted sync pulse is coupled through inverter I1 to NAND gate N2 where it is gated with the output 10 (FIG. 6HH) of flip-flop 32 and coupled through inverter I2 to the terminal C providing an internal reset waveform as shown in FIG. 7RR. The output 10 of flip-flop 32 (terminal D) is also coupled as input to the flip-flop 34 (7476) and to the NAND gate N3. The output 15 of flip-flop 33 (FIG. 6EE) is gated with the signal input to N3 and coupled through inverter I3 to form the waveform shown by FIG. 6OO, while the output 14 of flip-flop 33 forms the terminal H (FIG. 6FF). The output 15 of flip-flop 34 (FIG. 6II) forms terminal G and is gated in NAND gate N4 with the output of I3 before being inverted by I4 to form the waveform of terminal J (FIG. 7PP). In the same manner, the output 13 of flip-flop 34 forms terminal F (FIG. 7JJ) is gated with the output of I3 in NAND gate N5 before being inverted by I5 to form the waveform of terminal K (FIG. 7QQ). The output 11 of flip-flop 32 is taken alone to be the terminal E while switch S1 is coupled to the reset pins of flip-flops 32 and 34 to initially set the outputs 11 and 15, respectively, to the low state when the switch S1 is closed.

Figure 2:
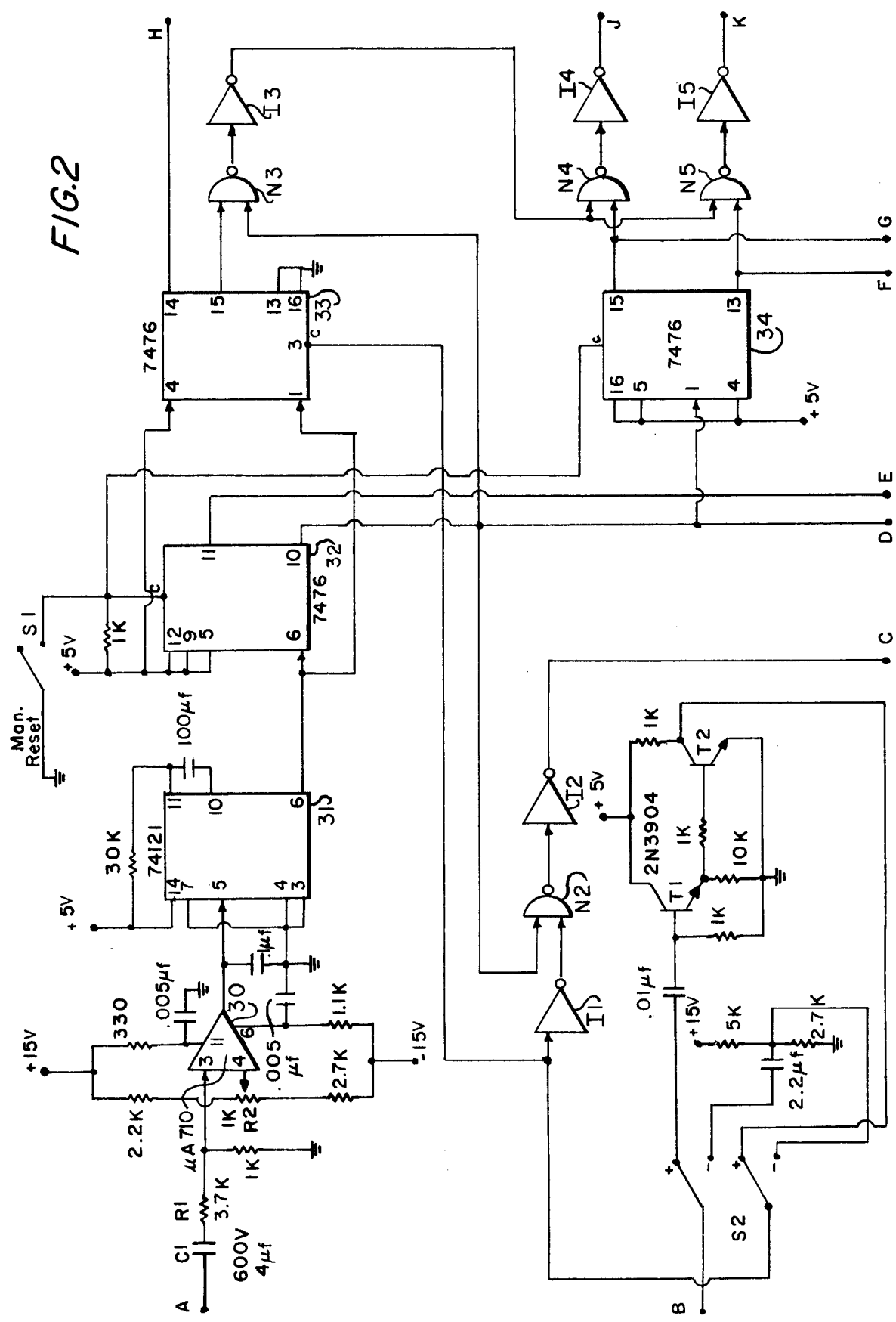
FIGS. 2-5 are schematic diagrams of the particular electrical circuits that form the elements of FIG. 1.
Figure 3:
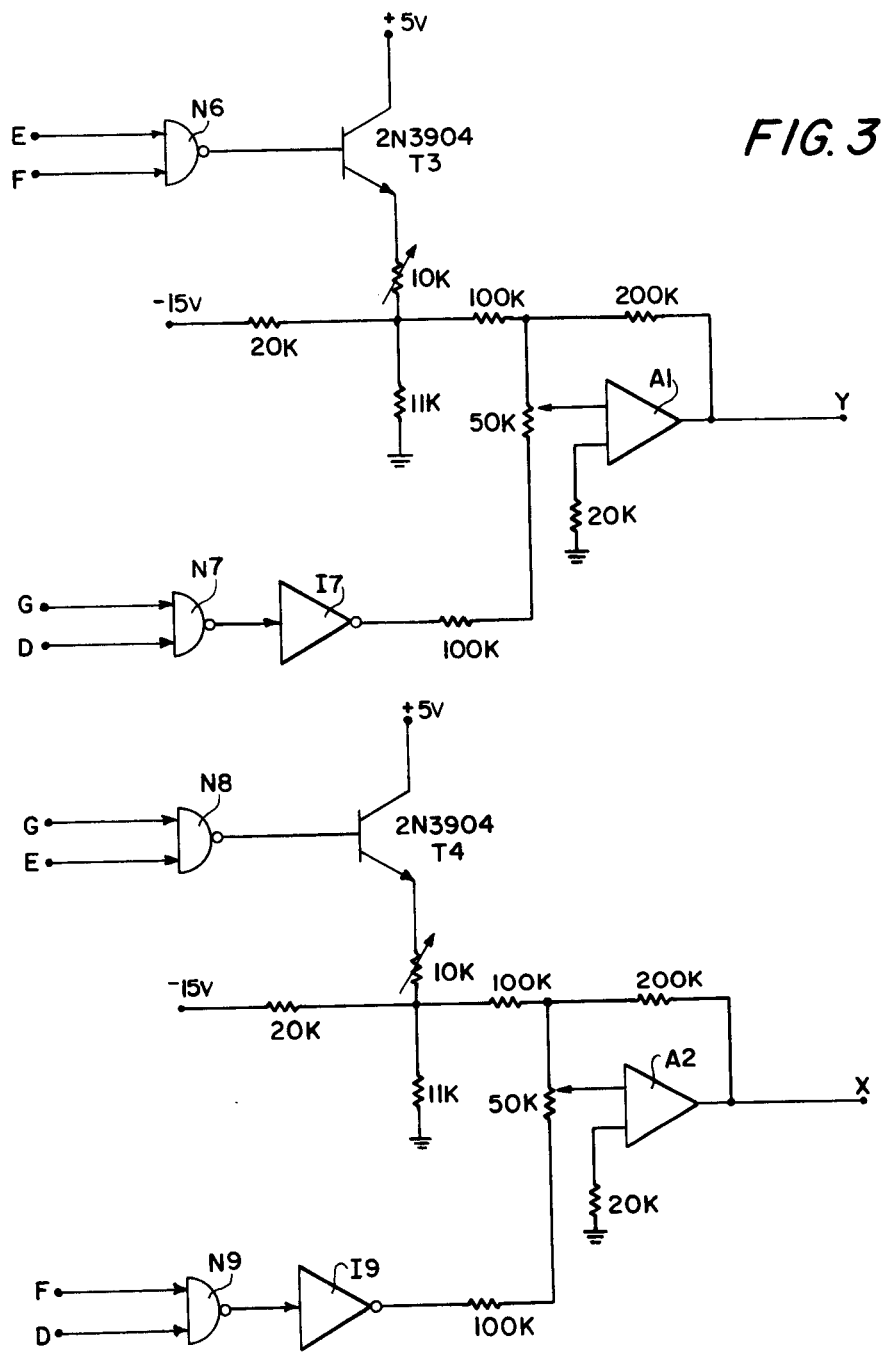

The timing control signals of terminals D, E, and F, G, from FIG. 2 are coupled to the axis rocking function control 12 as more particularly shown by FIG. 3. In this circuit signals from terminals E and F are gated in NAND gate N6 and coupled to transistor T3(2N3904) to provide a signal to the 50K potentiometer of operational amplifier A1. Signals from terminals G and D are gated in NAND gate N7 and passed through inverter I7 to provide a signal to the same 50K potentiometer of the operational amplifier A1. Depending on which signals are present at E, F, G, and D, the output of amplifier A1 will produce a waveform illustrated by FIG. 7MM which represents the Y axis rocking voltage. The waveform goes from 0 to + 10 volts at the start of one blanking pulse + 10 to − 10 volts at the start of the next blanking pulse and back to zero for the next two blanking pulses before repeating the cycle. The symmetry of the pulse about the zero axis is adjusted using the 50 K potentiometer while the height or magnitude is controlled using the 10K pot in the emitter of T3. The X axis rocking voltage of FIG. 7NN is produced using an identical circuit to that used to form the Y axis rocking voltage and will therefore not be described in great detail. It suffices to say that the signals from terminals G, E, F, and D are supplied to the elements N8, N9, I9, T4 and A2 as shown to produce the X axis rocking voltage. These voltages (X and Y) are then applied to piezoelectric elements to rotate the optical surfaces about X and Y axis in both positive and negative directions depending on the polarity of the waveform. It should be noted here that the waveforms shown in FIGS. 7MM and 7NN have been described after inversion by an external inverting power supply in order to provide the proper polarity to drive the piezoelectric elements. The actual output from terminals X and Y of FIG. 3 are inverted waveforms of those shown in FIGS. 7MM and 7NN.

Figure 4:
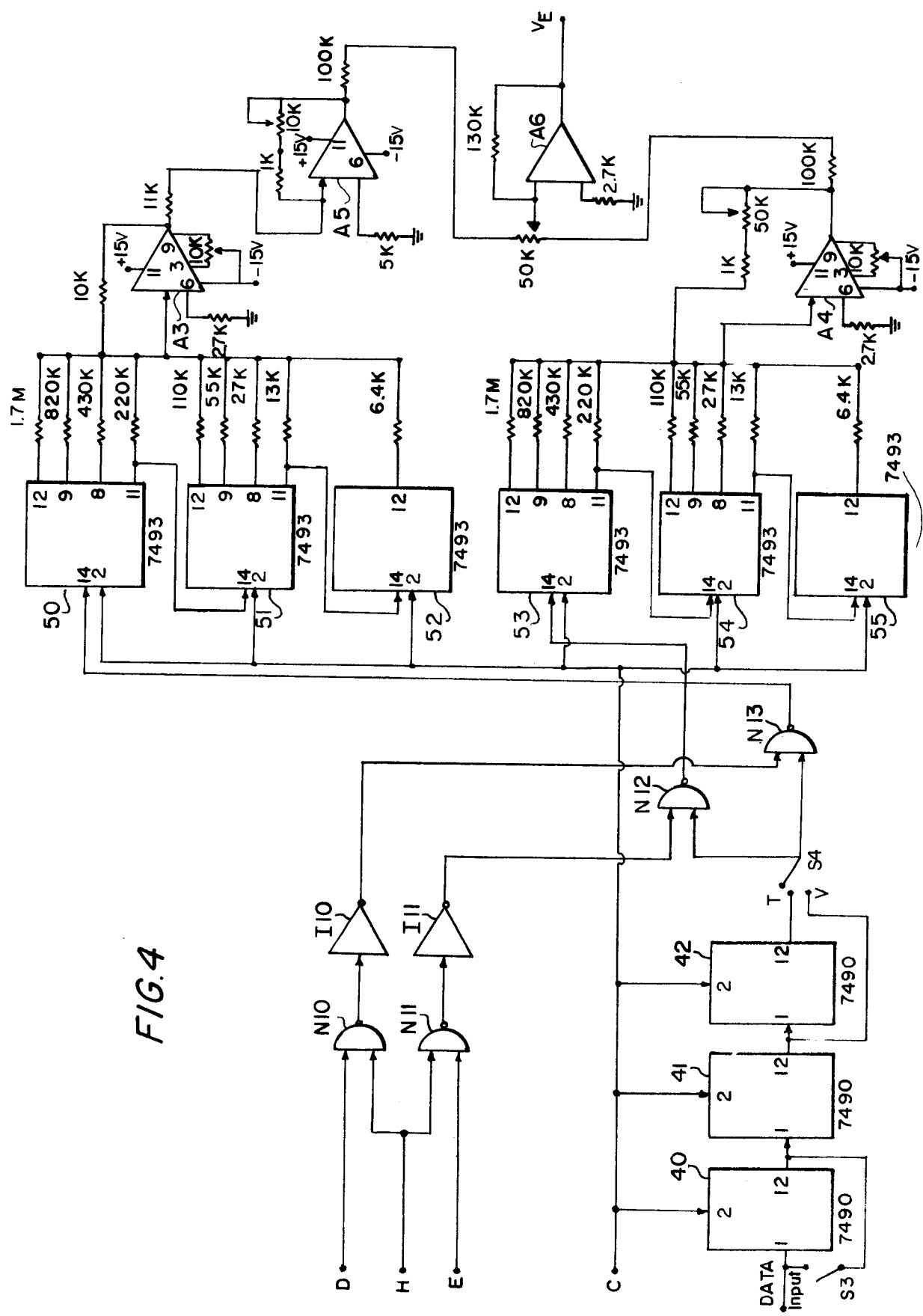

Turning now to FIG. 4, data input is received by a data scaler 13 generally formed from decade counters 40–42 (7490's) connected as shown. The decade counters are coupled to be reset by the signal from terminal C and provide various scaling ratios by using switches S3 and S4. In the present example, when the switch S3 is closed, the scaler will provide division by 10 with switch S4 in the T position and division by 100 with switch S4 in the V position. Alternatively, with switch S3 open, division by 100 or 1000 can be obtained with the switch S4 in the T or V position respectively. In addition to the pin connections shown, pins 5 and 3 of each 7490 is tied to + 5 volts, pins 11 and 14 are tied together, and pins 6, 7 and 10 are tied to ground in order to provide scaler operation.

The signals from terminals D, E, and H from timing circuits 11 are coupled to sampler gate and control 14 generally formed from elements N10–N13 and I10 and I11. Signals from terminals D and H are gated in NAND gate N10, inverted by I10 to form the waveform of FIG. 6KK and gated with the output of the scaler 13 in NAND gate N13 to form a first channel output. Signals from terminals H and E are gated in NAND gate N11, inverted by I11 to form the waveform of FIG. 7LL and gated with the output of the scaler 13 in NAND gate N12 to form a second channel output. Each of the outputs from N13 and N12 is coupled to a counter 15 and 16 respectively which count pulses from scaler 13 when properly gated by the signals from I10 and I11 in gates N12 and N13. The digital counters 15 and 16 are binary ripple counters formed from elements 50-52 and 53-55 (all 7493's) respectively. In addition to pin connections shown, pins 5 and 3 of counters 50–55 are tied to + 5 volts and pins 1 and 12 tied together in order to provide proper counter operation. The outputs from the counters 15 and 16 are then coupled to D/A converters 17 and 18 respectively. Converter 17 receives the output from counter 15 through a plurality of resistors and develops an analog signal through operational amplifier A3. In the same manner converter 18 receives output from counter 16 through a plurality of resistors and develops an analog signal through operational amplifier A4. In both cases the operational amplifiers A3 and A4 are biased as shown and provided with a 10K potentiometer adjustment at pins 3 and 9 to allow balancing of the outputs relative to each other. The output from A3 is inverted by operational amplifier A5 before being coupled with the output from A4 to the 50K potentiometer at the input of operational amplifier A6 which forms the summing amplifier 19 and produces a difference output $V_E$ between A3 and A4.

Figure 5:
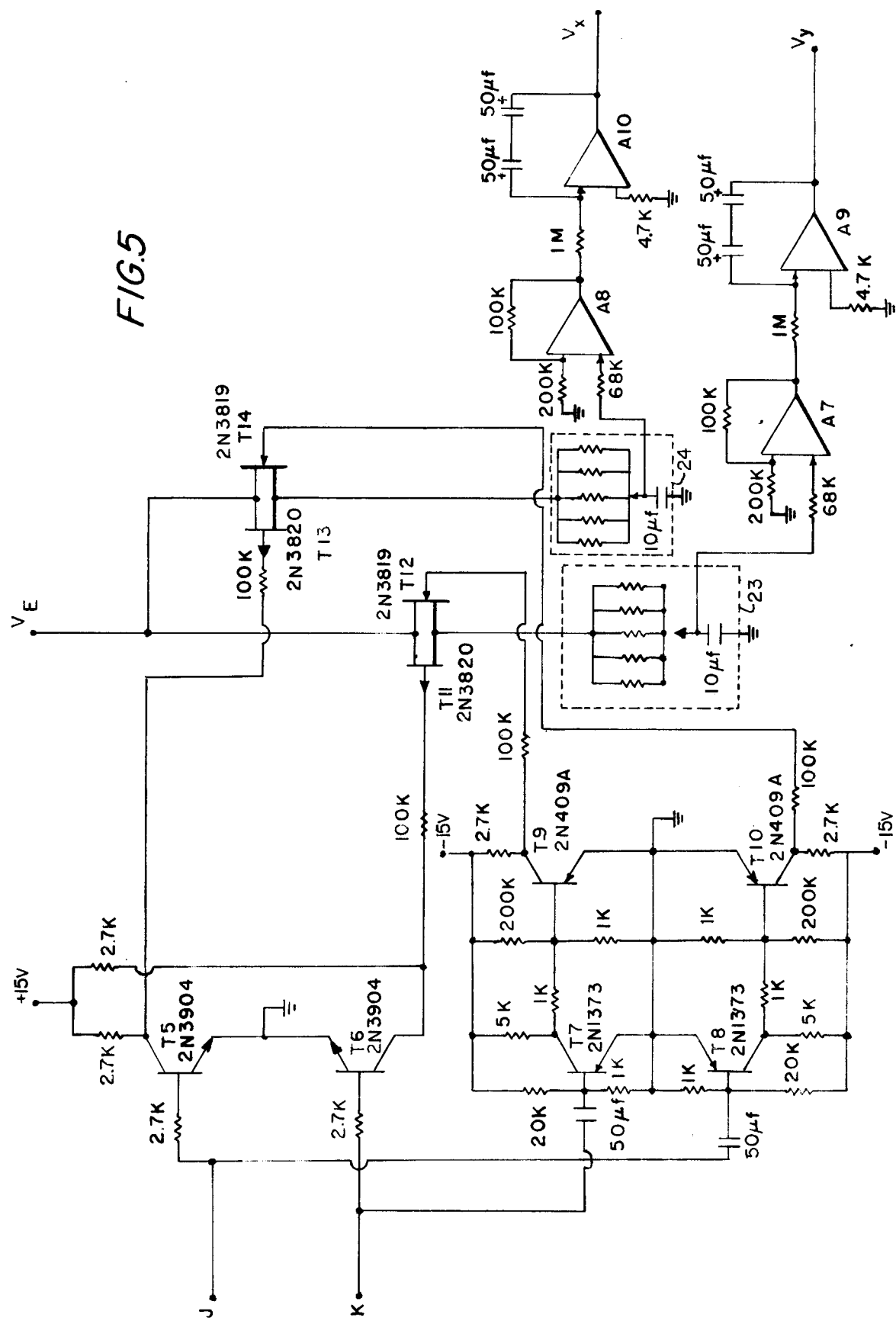

Turning now to FIG. 5, the switch control 20, X and Y axis switches 21 and 22, and the integrating circuits 23–28 are shown in greater detail. The $V_E$ signal from summing amplifier 19 is coupled to the switches 21 and 22 formed from two pairs of FET's T11, T12 and T13, T14. Each of the FET pairs have their sources coupled together and their drains coupled together with the input $V_E$ coupled to the sources of each FET pair and the output being taken from the drains. The switches are controlled by timing signals from terminals J and K which are converted to a proper voltage level to drive the FET's through transistor circuits T5–T10 to enable both positive and negative values of $V_E$ to be passed through the switches. Thus, for positive values of $V_E$, the gates of T11 and T13 initiate passage of the $V_E$ signal, and for negative values of $V_E$ the gates of T12 and T14 initiate passage of the $V_E$ signal. The $V_E$ signal from switches 21 and 22 are passed to variable RC circuits 24 and 23 respectively which are formed from identical variable resistor banks and 10 $\mu f$ capacitors as shown. Typical resistor bank values range from 200Ω to 200KΩ and are slaved together so that the charging rates of both 23 and 24 are simultaneously adjusted to the same value. The output from 23 is inverted by operational amplifier 25 (A7) and integrated by integrator 27 (A9) to form the Y axis correction voltage while the output from 24 is inverted by operational amplifier 26 (A8) and integrated by integrator 28 (A10) to form the X axis correction voltage.

Figure 6:
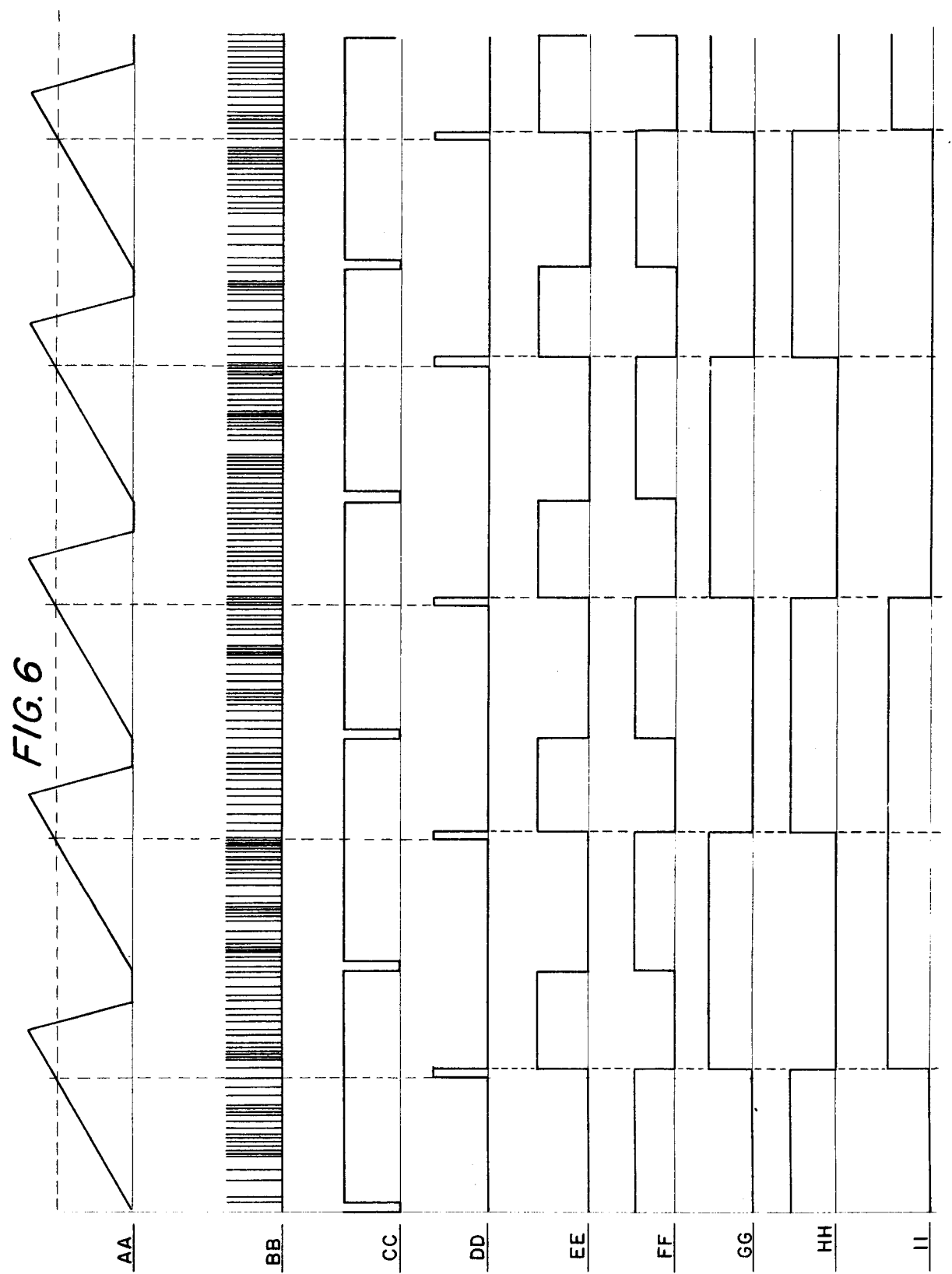

It should be noted that all logic used in the present example is 7400 series TTL with the numbers identifying the elements being conventional industry identifying numbers. All operational amplifiers used in the circuits are $\mu$741's with the top input being pin 4 and the bottom input being pin 5 for each of the amplifiers shown in the drawing. It should be additionally noted that the waveforms of FIG. 6 show the timing relationship of each of the waveforms at the identified points in the circuit relative to all other waveforms. Each of the waveforms is meant to represent a positive, negative, or zero voltage rather than specific magnitudes, although for the specific biasing shown, particular waveforms will have specific magnitudes. For example, for a + 5 volt sync pulse at B a converted trigger pulse of from 5 to 0 volts (FIG. 6CC) will be formed. Likewise, the blanking output from 33 will be a + 5 volt pulse starting at a point selected by R2 and ending at the beginning of the next ramp. As has been previously mentioned, the X and Y axis rocking voltages are single cycle bipolar square waves going from +10 to −10 volts and the outputs of integrators 27 and 28 are bipolar voltages from −10 to + 10 volts which represent the direction and magnitude of the correction needed for misalignment.

The operation of the stabilizing system will now be described with particular reference to FIGS. 1–7. Generally the stabilizing system according to the present invention is coupled to an interferometer structure of the type described in the journal *Optics Communications*, Vol. 2, No. 2, July, 1970, pg. 74. The interferometer generally has two optical surfaces mounted on piezoelectric elements and positioned substantially parallel, with one surface translated along a first Z axis by the ramp function and the other surface fixed on the Z axis but rotatable about orthogonal X and Y axes by electrical voltages applied to the piezoelectric mounting elements. The output light is then sensed by a photomultiplier tube which provides an output representing the intensity of light from the interferometer.

To initiate the stabilizing system according to the present invention, the manual reset switch S1 is closed to establish the output 11 of flip-flop 32 and the output 15 of the flip-flop 34 in the low state. The ramp voltage is coupled to linearly move the first optical surface along the Z axis and provide the ramp and sync inputs at points A and B respectively. After the manual reset switch S1 is momentarily closed, the next sync pulse resets flip-flop 33 forcing the output 15 to a low state, and is inverted and gated at N2 to provide a reset pulse from I2 to reset all counters 40–42 and 50–55. At a level in the ramp selected by the resistor R2 the internal trigger pulse is generated and standardized by flip-flop 31 before the trailing edge causes the output 15 of flip-flop 33 to go high initiating the blanking interval that begins at any point on the ramp selected by R2 and ends when flip-flop 33 is reset by the converted sync input of FIG. 6CC. The signals from terminals D, E, and H are gated at N10 and N11 as previously described and inverted at I10 and I11 to form the first and second channel sampling signals of FIGS. 7KK and 7LL respectively. The width of each sampling period is adjustable by the ramp level potentiometer R2 since each sampling period is equal to the unblanked portion of each ramp cycle. As can be seen, each channel sample pulse occurs on alternate cycles of the ramp such that N13 and N12 are alternately gated to pass scaled data pulses from scaler 13 to counters 15 and 16 respectively which appear only during unblanked portions of the ramp.

According to the present invention, the output of the photomultiplier tube is first passed through a pulse shaping network 104 such as a MODEL 813 PREAMP-/AMP/DISC made by Canberra Industries to form pulses of uniform amplitude and width (FIG. 6BB) but of random spacing which periodically become dense (up to $10^6$ pulses per second) in response to the light transmitted by the interferometer. When the optical surfaces of the interferometer are aligned (parallel) the pulse output for any ramp sweep will be maximum. The output of the photomultiplier tube and pulse shaping circuit is therefore coupled to counters 15 and 16 through the first and second channel sampling gates N13 and N12 respectively, which record the number of pulses received during each sampling period. In order to avoid counter overflow, the pulses are first passed through the scaler 13 as previously described which scales the count by selectable powers of from 10 to 1000 with switches S3 and S4, and is reset by the internal trigger from terminal C. In addition to the scaler 13, the counters may be prevented from overflowing by adjusting the sampling period (with resistor R2) such that the number of scaled counts is less than the counter capacity (9 bits or 512 counts) for any sampling period.

As was previously mentioned, since the number of pulses counted during a sampling interval is related to the alignment (parallelism) of the optical surfaces, it can readily be seen that the count can be used to determine optical alignment. As has been noted, while one optical surface of a swept interferometer is translated along a Z axis by a ramp voltage applied to its piezoelectric mounting element, the other optical surface can be rotated or rocked in a positive or negative direction about each of the orthogonal X and Y axes to make the second surface parallel to the translated surface. If the piezoelectric rocking element is initially positioned with a D.C. voltage so that the second optical surface is parallel to the translated surface, the initial position of the second surface can be designated as $\theta_X$ degrees about the X axis and $\theta_Y$ degrees about the Y axis with the angular displacements $\theta_X$ and $\theta_Y$ providing maximum transmission. Now by way of example, if the rocking element is rotated an additional $\Delta\theta_X$ degrees in the positive direction about the X axis, the surface will be misaligned and transmission (hence pulse count) will be reduced. If it is rotated back to $\theta_X$ and then rotated $\Delta\theta_X$ degrees in the negative direction the surface will be misaligned by exactly the same amount but in a different direction. The same holds true for the Y axis which can be explained analogously.

As can be seen, if the pulses are counted during the + $\Delta\theta_X$ misalignment and subtracted from the count during the $-\Delta\theta_X$ misalignment the difference should be zero if the initially fixed position $\theta_X$ was optimum for alignment about the X axis. If, however, $\theta_X$ does not provide the alignment of the surfaces, then rotating the element away from $\theta_X$ will move it closer to or further from alignment. Therefore, if the rocking element is rotated by the same amount both positively and negatively away from the initial $\theta_X$ position, and the pulses are counted after each rotation, a difference in count will be detected which represents in sign and magnitude the direction and degree of correction necessary to move the surface to a more parallel position.

According to the present invention, the bipolar rocking voltages from the circuit 12 at the terminal outputs of A1 and A2 (FIGS. 7MM and 7NN) perform the rocking in equal amounts about each axis, first in the positive direction and then in the negative direction. As illustrated by FIG. 7NN, the piezoelectric element is first rocked (rotated) in a positive direction about the X axis and, after the width of one blanking interval, the first channel sample gate N13 is opened by the sampling pulse (FIG. 7KK) to allow pulses from 13 to be counted for the sampling interval. The gate is chosen to pass the data pulses after the one blanking interval in order to provide the delay necessary to allow the piezoelectric element to respond to the step rocking voltage. The same element is next rocked an equal amount in the negative direction and, after the same blanking interval delay, counts pulses through gate N12 which is opened in response to the second channel sampling pulse (FIG. 7LL). During the next two ramp cycles the same sampling is carried out in an analogous manner for the Y axis with transfer of data occurring at the end of each rocking cycle (FIGS. 7PP and 7QQ).

Referring now to FIG. 5, the pulses counted during each X axis sampling interval are converted to analog form by the operational amplifiers A3 and A4 forming simple 9 bit analog to digital converters 17 and 18. The output from A3 is inverted by A5 so that the analog equivalent of the digital word in counters 50–52 is always positive or zero voltage and thus of opposite polarity from the analog equivalent of the digital word in counters 53–59 from A4 which is always negative or zero voltage. The amplifier 17(A6) is then used as a summing amplifier to provide an analog voltage $V_E$ representing the difference in count and thus the misalignment of the optical surface about the X axis after the X axis rocking cycle. By analogy to the X axis the same count and difference is provided at the end of the Y axis rocking cycle to give an analog voltage $V_E$ representing misalignment about the Y axis.

As can be seen from FIGS. 7PP and 7QQ, data transfer pulses are available at the end of each rocking cycle to transfer the voltage $V_E$ through the appropriate switch 21 or 22 to deliver the voltage to the integrating circuit 24 or 23 respectively. Thus, an X axis transfer pulse occurs at the end of the X axis rocking cycle (FIG. 7PP) and opens FET switches T13 and T14 to transfer any X axis error voltage and a Y axis transfer pulse occurs at the end of the Y axis rocking cycle (FIG. 7QQ) and opens FET switches T11 and T12 to transfer any Y axis error voltage. These transfer pulses occur alternately and open FET's T11–T14 to pass either positive or negative error voltage as previously described.

Now, since the output pulse train from the photomultiplier is a random function (in spite of periodic density peaks) the counts per ramp sweep will never be the same even if the optical surfaces are perfectly parallel. Thus the error voltages will fluctuate in accordance with the statistics of the random pulse train input. It is therefore not desirable to attempt to correct for alignment based on the expected short term statistical deviation of the X and Y axis error signals. The X and Y error signals are therefore passed through switches 21 and 22 to the variable RC circuits 24 and 23 respectively as previously described. The time constants of 23 and 24 are made to smooth out the fluctuations of each error signal and then passed through amplifiers 25 and 26 to operational integrators 27 and 28 (A9 and A10) having time constants of about 1 minute or greater to perform long term averaging of the X and Y error voltages. In this manner the error signals at the output of 27 and 28 represent time averaged voltages representing misalignment which can be coupled to the piezoelectric mounting elements to reposition the optical surfaces for optimum alignment. In the present configuration, the RC integrators 23 and 24 are only optional to provide additional smoothing of the error voltages and could be dispensed with. It should also be noted that due to polarity inversion by circuit amplifiers the X and Y error signals from 28 and 27, respectively, must be applied to additional external inverting power supplies 106, 108 in order to provide the proper polarity and power to the piezoelectric elements to correct misalignment. These power amplifiers may, for example, be Model NTC 2000 operational power supplies made by Kepco, Inc., 131 Sanford Ave., Flushing, New York.

As can be seen from the above description, the present invention provides an improved system for compensating for misalignment of optical surfaces in an interferometer that can be implemented with conventional integrated circuit technology. Utilizing only conventional elements to form the system, the interferometer can be stabilized against temperature and mechanical variations over long time periods. Unlike structures of the prior art, the present invention requires no additional prisms or photomultipliers to introduce further inaccuracies and remains operative to correct misalignment without monitoring or adjustment. Using a unique timing and FET switch arrangement, the stabilizer is capable of responding to positive and negative error voltages without a multiplicity of duplicate elements. All of these are advantages not found in the prior art as previously mentioned.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A system for stabilizing interferometers comprising:
   means for receiving a repetitive waveform and a sync pulse during each repetition;
   timing means responsive to said waveform and said sync pulse for generating timing pulses at predetermined times during each repetition of said waveform;
   means responsive to said timing means for generating a first bipolar control voltage cycle and a second bipolar control voltage cycle during alternate intervals;
   means for receiving a train of frequency modulated pulses;
   gating means coupled to said receiving means and responsive to said timing means for providing an output of said modulated pulses during predetermined periods of each polarity of each bipolar control voltage cycle;
   digital means coupled to said gating means for counting the modulated pulses passed by said gating means during a first polarity period and second polarity period of each bipolar control voltage cycle; and
   means coupled to said digital means for converting the difference in count passed during said first and second polarity periods of each cycle to an analog error voltage.

2. The system of claim 1 further including;
   first and second integrating means each receiving an input signal and providing an integrated output;
   means responsive to said timing means for coupling said error voltage from alternate cycles of said bipolar control voltages as the input signal to said first and second integrating means respectively.

3. The system of claim 2 wherein said means for coupling comprises, a first and second pair of field effect transistor switches with each pair coupled to pass bipolar voltages as the input signal to a different one of said integrating means.

4. The system of claim 1 wherein said means for receiving a train of frequency modulated pulses comprises a digital scaler coupler to receive a predetermined number of pulses and pass a reduced number of pulses proportional to the number received.

5. The system of claim 4 wherein said digital means includes, a first digital counter for counting said pulses passed by said gating means during said first polarity periods and a second digital counter for counting said pulses passed by said gating means during said second polarity periods, said digital counters being coupled to said timing means such that each counter is reset to zero after each bipolar voltage cycle.

6. The system of claim 5 wherein said means for converting comprises, first digital-to-analog converter means coupled to convert the digital count of each first polarity period to a first analog signal, second digital-to-analog converter means coupled to convert the digital count of each second polarity period to a second analog signal, and amplifier means for subtracting the first and second analog signals of each bipolar voltage cycle to form said error voltage.

7. The system of claim 6 wherein said means for receiving said waveform and sync pulse is constructed to receive a repetitive ramp waveform and sync pulse at the start of each repetition and wherein said timing means includes, means responsive to said ramp and sync pulse for generating a control pulse starting at the beginning of each ramp, and means for adjusting the period of said control pulse to end at an adjustable point during each ramp.

8. The system of claim 7 wherein said means for generating bipolar control voltages is constructed to generate each bipolar voltage cycle with an interval of first polarity starting at a first adjustable point and equal in time to one repetition period of said ramp, and an interval of second opposite polarity starting at the next succeeding adjustable point and equal in time to one repetition period of said ramp and wherein said gating means is responsive to said control pulses such that pulses from said modulated pulse train are only passed during the time period starting at the beginning of each ramp and ending at the adjustable point.

9. The system of claim 1 further including an interferometer having first and second optical surfaces providing an output beam of light and means coupled to convert said output light into said train of frequency modulated pulses.

10. The system of claim 9 wherein said first and second optical surfaces are mounted on first and second piezoelectric control elements respectively and wherein said first and second bipolar control voltages are coupled to said first piezoelectric control element in such manner as to cause positive and negative rotation about two orthogonal axes.

11. The system of claim 10 wherein said second piezoelectric control element is coupled to receive said repetitive waveform in such manner that said second optical surface will move toward and away from said first optical surface on a third axis in response to said waveform.

12. The system of claim 11 further including first and second integrating means each receiving an input signal and producing an integrated output; and means responsive to said timing means for coupling said error voltage from alternate cycles of said bipolar control voltages as the input signal to said first and second integrating means respectively, said integrated output from each integrating means being coupled to said first piezoelectric element in such manner as to cause positive and negative rotation about two orthogonal axis so as to maintain the first and second optical surfaces in parallel.

* * * * *